United States Patent

Yost

[11] 3,995,510
[45] Dec. 7, 1976

[54] CONTROL SYSTEM FOR A HYDROSTATIC TRANSMISSION

[75] Inventor: John P. Yost, Willoughby, Ohio

[73] Assignee: Towmotor Corporation, Mentor, Ohio

[22] Filed: May 5, 1975

[21] Appl. No.: 574,802

[52] U.S. Cl. .............................. 74/478.5; 74/470; 74/478; 74/512; 74/560; 180/77 R
[51] Int. Cl.² ........................................ G05G 13/02
[58] Field of Search ................ 74/478.5, 478, 470, 74/512; 180/77 R

[56] References Cited
UNITED STATES PATENTS

| | | | |
|---|---|---|---|
| 3,241,394 | 3/1966 | Rubenstein | 74/470 X |
| 3,525,266 | 8/1970 | Brooks et al. | 74/478 X |
| 3,691,863 | 9/1972 | Shaffer | 74/478 |

Primary Examiner—Samuel Scott
Assistant Examiner—F. D. Shoemaker
Attorney, Agent, or Firm—Philips, Moore, Weissenberger, Lempio & Strabala

[57] ABSTRACT

A control linkage arrangement for the throttle and transmission of a lift truck or the like is provided with a juxtaposed arrangement of a throttle and two transmission control pedals, arranged for simultaneous operation of the throttle and either one of the forward or reverse transmission control pedals by one foot of an operator for controlling translation of the vehicle.

The forward and reverse pedals are arranged to either side of the throttle pedal, with all pedals having a common neutral position and all movable in the same direction for their control functions. A slot in the throttle pedal and a pin on one of the adjacent transmission control pedals permits the throttle pedal to move a predetermined amount before engagement of the pin of the adjacent pedal by the foot of an operator.

8 Claims, 3 Drawing Figures

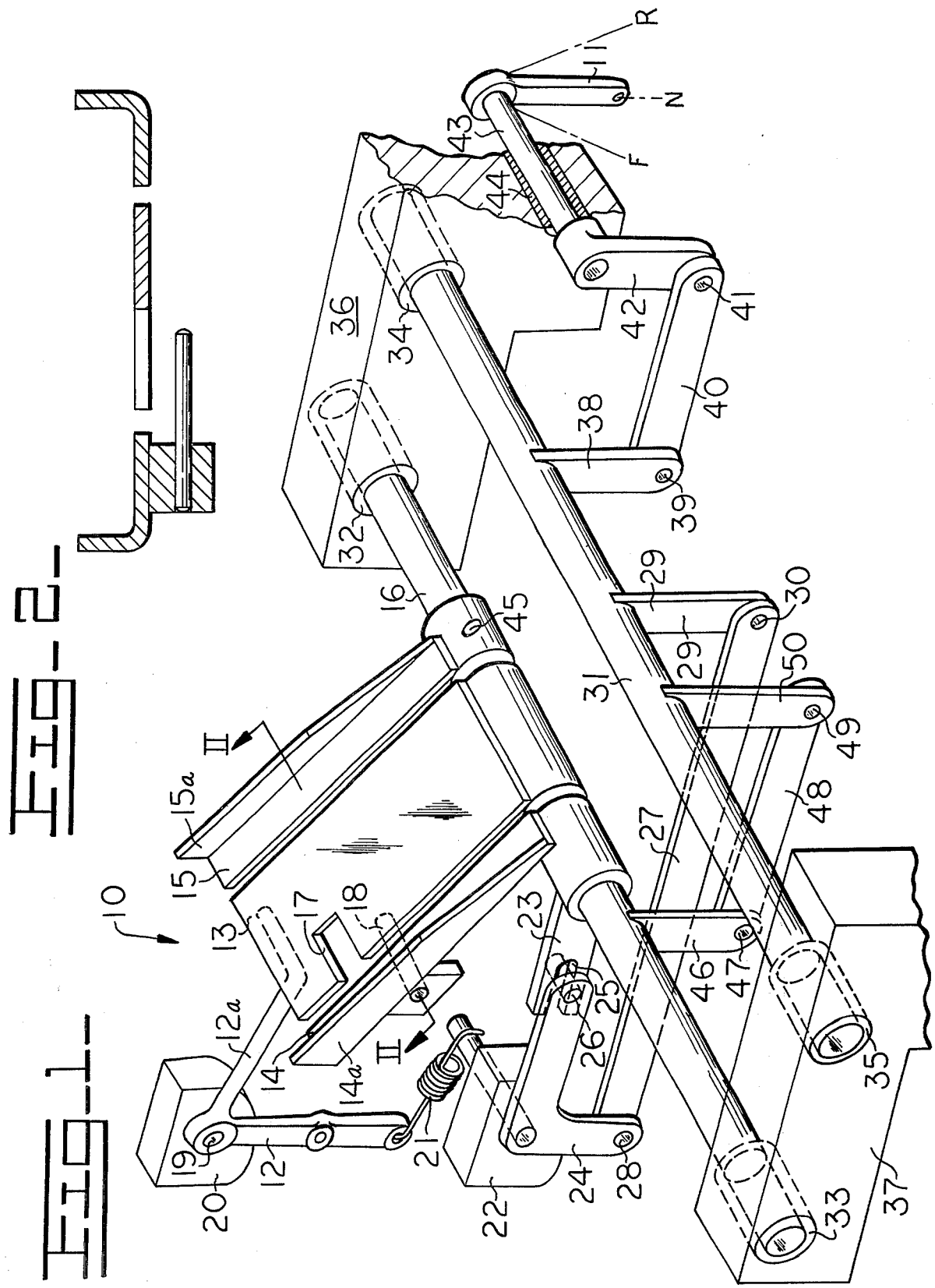

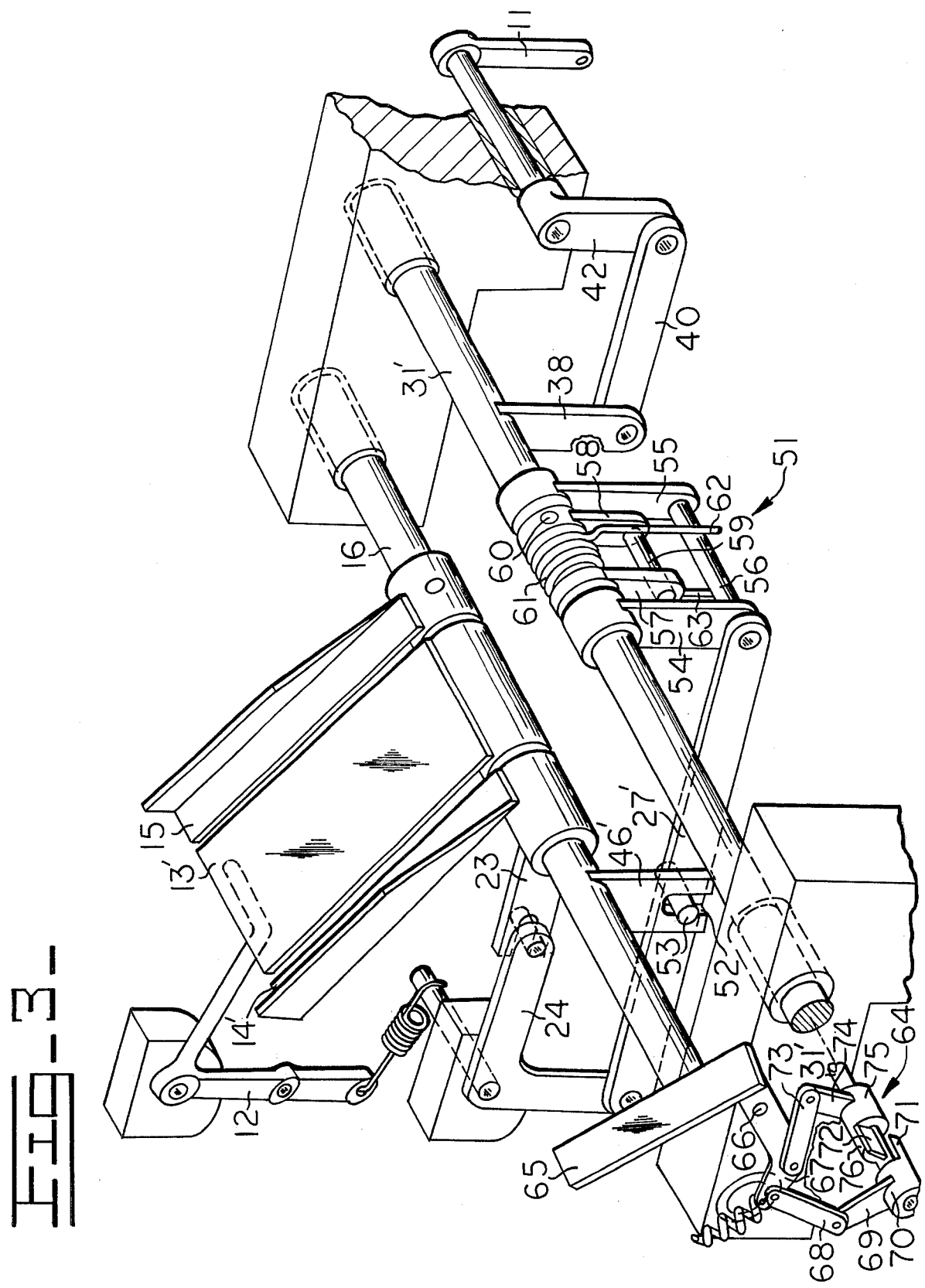

CONTROL SYSTEM FOR A HYDROSTATIC TRANSMISSION

BACKGROUND OF THE INVENTION

Lift trucks and other article-handling vehicles usually require that an operator turn the vehicle and control its translation over the supporting surface at the same time that he is manipulating the article-handling forks or implement. Since the steering of the vehicle and the manipulation of the article-handling means is normally controlled by the operator's hands, it is necessary that means controllable by his feet are operative to control the direction and speed of the vehicle. It is also desirable that the operator be able to control as many of these functions as possible with one foot.

Numerous control systems have been proposed for such vehicles. However, such systems have failed to provide an optimum combination to provide the desired functional convenience.

Summary and Objects of the Invention

It is therefore a primary object of the present invention to provide a control arrangement for the convenient control of the accelerator and transmission directional control of a vehicle simultaneously with a single foot.

Another object of the present invention is to provide a vehicle control arrangement that is simple and effective to provide simultaneous operation of the throttle and directional control of a vehicle by a control motion in a single direction.

A still further object of the present invention is to provide a control arrangement for a hydrostatic drive vehicle wherein the throttle and directional control of the vehicle may be accomplished simultaneously by one foot of an operator.

In accordance with the primary aspect of the present invention, a vehicle accelerator pedal and a pair of directional control pedals are juxtaposed so that an operator may simultaneously depress the accelerator pedal and either one of the directional control pedals with a single foot.

BRIEF DESCRIPTION OF THE DRAWING

The above and other objects and advantages of the present invention will become apparent from the following description when read in conjunction with the accompanying drawings, wherein:

FIG. 1 is a perspective view of a control arrangement in accordance with the preferred embodiment of the present invention;

FIG. 2 is a view taken generally along lines II—II of FIG. 1;

FIG. 3 is a view like FIG. 1 of an alternate embodiment of the present invention.

DETAILED DESCRIPTION OF PREFERRED EMBODIMENTS

Referring now specifically to FIG. 1, there is illustrated a control arrangement in accordance with the present invention comprising a foot pedal arrangement indicated generally at 10 operably connected by suitable linkage means, to be described, to effect a transmission directional control lever 11 in either a forward or reverse direction, and simultaneously therewith effect movement of a throttle control member or link 12 for controlling the engine of the vehicle.

The pedal assembly 10 generally comprises a first or central pedal 13 which constitutes or comprises the throttle pedal, a second pedal 14 closely adjacent thereto to one side thereof for controlling the transmission in a forward direction and a third pedal 15 closely adjacent to the right side for controlling the transmission in a reverse direction. These pedals 13–15 all generally lie in the same plane and are pivoted for movement about a common axis with a shaft 16.

These pedals are arranged so that the center pedal and either one of the side pedals 14 or 15 may be conveniently depressed simultaneously.

The pedals 13–15 are all mounted for pivotal motion about a common axis coinciding with the axis of the shaft 16. These pedals all lie in the same plane with pedal 13 preferably exceeding the width of the average operator's foot so that the center pedal may be depressed without depressing either one of the adjacent pedals. It will also be appreciated that simultaneous depression of the center pedal with either of the other pedals is accomplished simply by moving the foot to the left, for example, against the vertical wall or stop member 14a of pedal 14, or to the right against the vertical wall or stop member 15a of pedal 15, and depressing the two pedals simultaneously.

It will also be noted that the center pedal includes a slot 17 through which a pin 18 connected to pedal 14 may pass. This permits the center pedal 13 to be depressed without depressing the pedal 14. It also permits the center pedal to be depressed a predetermined amount, as best seen in FIG. 2, prior to engagement of the pin 18 by the foot of the operator to simultaneously depress the center pedal and the second pedal 14. This constitutes a so-called creep control so that the engine of the vehicle may be revved up to a higher rpm before engagement of the transmission control pedal 14 for forward control.

The higher engine rpm is necessary to power the implement pump for supplying sufficient fluid to lift a load. Creep of the vehicle can be obtained by rotating or tilting the swash plate some small angle from zero.

The throttle control pedal 13 is connected in any suitable manner to throttle control linkage such as, for example, by the bell crank 12 having an arm 12a extending outward and engaged by the pedal 13. The bell crank 12 is pivotally mounted about a suitable pivot 19 to suitable base frame or structure member 20 of a vehicle or the like. Suitable means such as a spring 21 is connected between bell crank 12 and frame support member such as at 22 for biasing the throttle to the return position.

The transmission control pedals 14 and 15 are suitably connected by control linkage means for moving control link or arm 11 in an appropriate direction to achieve forward or reverse direction of the vehicle. Forward or reverse is achieved by tilting the swash plate of the variable pump from zero in one direction for forward and in the other direction for reverse. The forward control pedal 14 is pivotally mounted on suitable means such as shaft 16 and includes an arm 23 extending forward thereof and connected in a suitable manner to a bell crank 24 by a pin-and-slot arrangement comprising a slot 25 formed in member 23 and a pin 26 extending from an arm of bell crank 24 into the slot 25. Thus, rocking movement of arm 23 imparts a rocking movement to the bell crank 24. The movement of bell crank 24 is in turn transmitted by a link 27 which is pinned to define suitable pivot means 28 to the end of the bell crank 24 and to an arm 29 by a pivot means 30 to a second shaft 31. The two shafts 16 and 31 are disposed in parallel relationship to one another and rotatably mounted in respective bearings 32, 33, 34, 35 in suitable laterally spaced frame or support members 36 and 37.

The second shaft 31 is connected by suitable linkage means including an arm 38 which is pivotally connected at 39 to a link 40 which in turn is pivotally connected at 41 to an arm 42 connected by a shaft 43 to transmission control lever 11. The control lever 11 is connected to a servo-valve for controlling the tilt of a swash plate of a variable displacement pump of a hydrostatic transmission. The shaft 43 is journaled in a suitable manner such as by means of bearing 44 to frame or support member 36.

The linkage operates such that a downward motion or depression of pedal 14 translates through the above-described linkage to a rotary motion of second shaft 31 which in turn translates that motion to a rotary motion of shaft 43 and a motion of the shift control lever 11 to the forward shifting position designated by the letter f. When the pedal 14 is in its rest or neutral position 14 as shown, the control member 11 is likewise in its neutral position as shown.

The reverse lever 15 is connected in a more direct manner to the transmission control link or lever 11. The reverse pedal 15 is pinned directly at 45 to shaft 16 for rotation directly therewith, which rotation is translated by a lever 46 which is pivotally connected at 47 to the link 48 which in turn is pivotally connected at 49 to an arm 50 which is connected directly to shaft 31. Thus, the shaft 31 rotates directly with shaft 16 on depression of the reverse pedal 15. This motion of shaft 31 is translated directly through the linkage 38, 40, 42 to the control link or lever 11. Thus, a depression of pedal 15 translates directly into a motion of the link 11 to the R position as shown for reverse of the transmission of the system.

Thus, it can be seen that the above-described transmission and throttle control arrangement permits an operator to simultaneously depress the accelerator pedal and either one of the forward or reverse pedals with one foot. Thus, he can control the forward or reverse motion of the vehicle and its speed of forward or reverse by one foot while at the same time manipulating other controls with his hands. The arrangement also provides a creep control arrangement as previously described, wherein the accelerator pedal may be depressed a first predetermined range prior to engagement of the forward transmission control pedal to thereby permit the operator to have a more precise control over the transmission at critically low speeds. The pedal and transmission control arrangement is devised primarily for hydrostatic control systems wherein the transmission control lever 11 is connected in a manner to swivel the swash plate of the hydrostatic pump from a neutral or zero displacement position to a maximum position for either forward or reverse. It should be understood that this arrangement could also be utilized with other types of transmission.

Turning now to FIG. 3, there is provided a modified embodiment of the invention wherein an override control pedal and modification therefor is provided. This override control arrangement essentially takes the place of the creep control described in the previous embodiment. For the sake of simplicity, elements in this embodiment which are identical to elements in the previous embodiment will be represented by identical reference numerals. Elements which have been slightly modified will be identified by the same numeral primed. New elements will be given new reference numerals.

The transmission control pedals 14' and 15 are connected by linkage means to a link 27' which is connected through resilient connection means 51 to the shaft 31' which is connected as previously described to the transmission control link 11. The foot pedal 14' is connected through linkage as previously described to the link 27 as in the previous embodiment. The foot pedal 15 is connected to the shaft 16 for rotation thereof, which in turn includes a lever arm 46' which is connected by means of a slot 52 to a pin 53 which in turn is connected to the link 27. This arrangement provides a direct connection of both the pedals 14' and 15 to the link 27'.

The resilient connection designated generally by the numeral 51 comprises first and second arms 54 and 55 which are both rotatably mounted on shaft 31' and are pinned together by means of a pin 56. Disposed between these two arms are a second pair of arms 57 and 58 which in turn are also pinned together by means of a pin 59. At least one of these arms 58 is pinned at 60 to the shaft 31'. The outer pair of arms 54 and 55 are connected in a resilient manner to the inner arms 57 and 58 by means of a spring 61 which includes a coiled portion which encircles a shaft 31' and a pair of arms 62 and 63 extending outward therefrom, one on each side of and adapted to engage or be engaged by the respective pins 56 and 59. Thus a motion of the link 27' to the right imparts a counterclockwise motion to pin 56 about the shaft 31, which motion is translated by means of arm 62 of spring 61 to the spring, which in turn is translated to the second arm 63 of the spring and to the pin 59 to force pin 59 likewise in the counterclockwise direction which, because of the connection of link 58 to shaft 31, imparts that counterclockwise motion to the shaft 31'. The strength of the spring 61 is sufficient that normally movement of the link 27 carries with it a like movement of the shaft 31 and consequently a motion of the transmission control lever 11. This resilient connection 51, however, permits the shaft 31' to be rotated with respect to the link 27'. This permits an override of the control pedals 14' and 15.

Override means for acting on shaft 31' for overriding the motion imparted thereto by means of the transmission control pedals 14' and 15 is indicated generally at 64. This override control means comprises a foot pedal 65 adapted to be depressed by the opposite foot of the operator from that used to depress the accelerator and tansmission shift pedals. The override pedal 65 includes an arm 67 which is pivotally connected at 66 to the vehicle frame and is connected by link means 68 to an arm 69 which in turn is connected to a collar 70 which is rotatably mounted on an extension of shaft 31'. The collar 70 includes a finger 71 extending around the shaft 31 for engagement with one side of a block or the like connected to the shaft 31 and extending radially outward therefrom. The arm 67 is connected by another link 73 to another arm 74 which in turn is connected to a collar 75 having a finger 76 extending axially outwardly therefrom for engaging the opposite side of the block 72.

It will be seen that when pedal 65 is depressed, the linkage connection thereof to the respective collars 70 and 75 will cause them to rotate in opposite directions toward the block 72 for engagement thereof. It will be appreciated that these are adjusted so that when both fingers 71 and 76 engage opposites of block 72, the block will be moved to essentially the neutral position. This movement of the shaft 31 will override any movement imparted thereto by the resilient connection means 51 and thus reduce or return the control lever 11 to its neutral position. Thus any position of the transmission control lever 11 imposed thereon by means of either one of transmission control pedals 14' or 15 may be overridden by means of the override pedal 65 and brought back to substantially the center or neutral position thereby. This permits a creep control of the vehicle in either the forward or the reverse direction by means of the override pedal by reducing the displacement of the transmission control lever 11 to near the neutral position while the throttle pedal 13 is depressed to raise the rpm of the vehicle engine. Thus, with this control sufficient, rpm of the engine can be developed to lift a heavy load while the vehicle is either standing still or creeping.

Although the invention has been described by means of specific embodiments, it is to be understood that numerous changes and modifications may be made therein without departing from the spirit and scope of the invention as defined in the appended claims.

I claim:

1. A transmission and throttle control assembly for a vehicle, said control assembly comprising:
    a first foot pedal means for operating a throttle linkage when moved in a forward direction;
    a second foot pedal means for operating a transmission control linkage in a forward direction when said second foot pedal means is moved in a forward direction;
    a thrid foot pedal means for operating said transmission control linkage in a reverse direction when said third foot pedal means is moved in a forward direction; and
    said first foot pedal means, said second foot pedal means and said third foot pedal means being mounted in a common plane, pivotal about a common axis and closely juxtaposed so that said first foot pedal means and any one of said second and third foot pedal means may be depressed simultaneously by a single foot of an operator.

2. The control linkage assembly of claim 1 wherein said second and third foot pedal means are disposed to either side of said first foot pedal means.

3. A transmission and throttle control assembly for a vehicle, said control assembly comprising:
    a first foot pedal means for operating a throttle linkage when moved in a forward direction;
    a second foot pedal means for operating a transmission control linkage in a forward direction when said second foot pedal means is moved in a forward direction;
    a third foot pedal means for operating said transmission control linkage in a reverse direction when said third foot pedal means is moved in a forward direction;
    said first, said second and said third foot pedal means being mounted in a common plane and pivotal about a common axis, and said second and said third foot pedal means are closely disposed to either side of said first pedal means so that said first foot pedal means and any one of said second and third foot pedal means may be depressed simultaneously by a single foot of an operator; and,
    means for bypassing said second foot pedal means by said first foot pedal means for a first range of movement and then engaging said second foot pedal means for continued movement therewith.

4. A transmission and throttle control assembly for a vehicle, said control assembly comprising:
    a first foot pedal means for operating a throttle linkage when moved in a forward direction;
    a second foot pedal means for operating a transmission control linkage in a forward direction when said second pedal means is moved in a forward direction;
    a third foot pedal means for operating said transmission control linkage in a reverse direction when said third pedal means is moved in a forward direction;
    said first, said second, and said third foot pedal means being closely mounted in a common plane and pivotal about a common axis so that said first foot pedal means and any one of said second and third foot pedal means may be depressed simultaneously by a single foot;
    a first transverse rotatable shaft for pivotally supporting said pedal means;
    means connecting one of said first, said second and said third foot pedal means to said first shaft for rotating said shaft upon depression of said one of said foot pedal means;
    a second shaft rotatably mounted adjacent to and parallel to said first shaft;
    first linkage means for connecting said second shaft to said first shaft for rotation therewith in the same direction; and
    second linkage means connecting another of said first, said second and said third foot pedal means to said second shaft.

5. The control linkage assembly of claim 4 including a transmission control lever and linkage means connecting said second shaft to said transmission control lever.

6. The control linkage assembly of claim 3 wherein said means for bypassing said second pedal means by said first pedal means comprises a slot formed in said first pedal means, and a pin extending outward from said second pedal means below said slot in said first pedal means so that an operator's foot can engage said pin through said slot when said first pedal means has passed said second pedal means.

7. The control linkage assembly of claim 4 including override control means for overriding either one of said second and third pedal means.

8. The control linkage assembly of claim 7 wherein said first and second linkage means includes resilient means so that said second shaft can be rotated independently of said first shaft.

* * * * *